Oct. 3, 1950
SAMUEL VICTOR
NOW BY JUDICIAL CHANGE OF NAME
SAM WOMEN SAM
TOOTH CLEANER
Filed Feb. 12, 1949
2,524,412
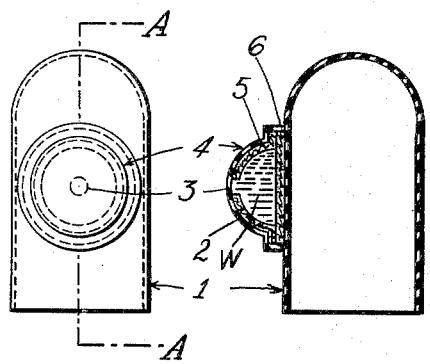
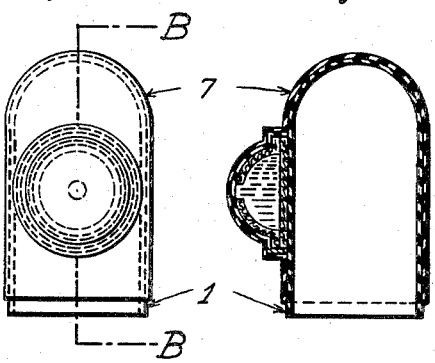
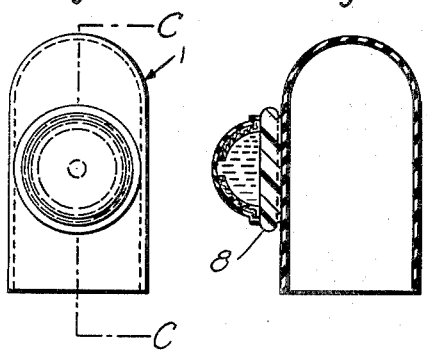
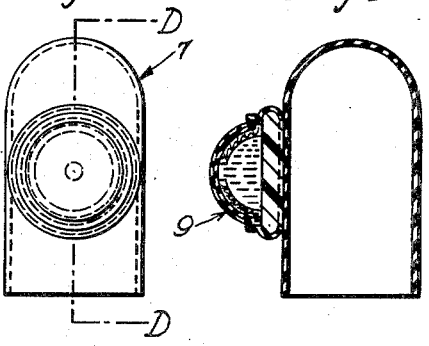
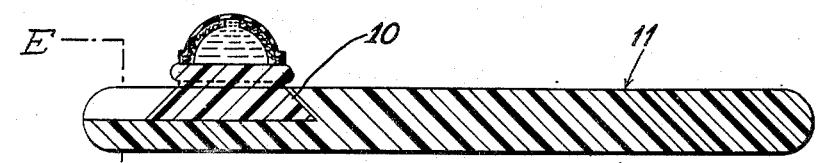
INVENTOR.
Samuel Victor
NOW BY JUDICIAL CHANGE OF NAME
SAM WOMEN SAM Patented Oct. 3, 1950

2,524,412

UNITED STATES PATENT OFFICE 2,524,412

TOOTH CLEANER

Samuel Victor, Chicago, Ill., now by judicial change of name Sam Women Sam

Application February 12, 1949, Serial No. 76,049

10 Claims. (Cl. 15—209)

My invention relates to a tooth cleaner as a substitute for a tooth brush.

One object of the invention is to provide a tooth cleaner whose teeth cleaning surface automatically conforms to, and contacts the various contours of the teeth and gums and reaches between the teeth and into the recesses and other concavities and thus cleans substantially entire exposed surfaces of the teeth.

Another object is to provide such a tooth cleaner which moreover reaches underneath the margins of the gums and cleans the necks of the teeth underneath the margins of the gums.

Another object is to provide such a tooth cleaner whose teeth cleaning surface presses uniformly substantially the entire exposed surfaces of the teeth and gums as firmly as the tooth cleaner is pressed against the teeth and gums.

Another object is to provide such a tooth cleaner whose tooth cleaning surface is impermeable to dentifrice and thus retains dentifrice applied to it in contrast to the tooth cleaning surface of a tooth brush.

Another object is to provide such a tooth cleaner which is adapted to be mounted at a suitable spot on an index finger tip cot.

Another object is to provide such a tooth cleaner which is adapted to be covered and thus protected from wear by a less expensive detachable skin.

Another object is to provide such a tooth cleaner which does not irritate, bruise the gums and moreover which on the contrary has a beneficial massaging effect on the gums in contrast to a tooth brush.

Other objects and advantages become apparent as the description proceeds.

I attain these objects by mechanism illustrated in the accompanying drawing, in which—

Figure 1 is a front view of one form of the tooth cleaner; Figure 2 is an axial section of the tooth cleaner on the line A—A, Figure 1; Figure 3 is a front view of the assembly of the same form of tooth cleaner as shown in Figures 1 and 2 and a latex rubber tissue skin; Figure 4 is an axial section of the assembly on the line B—B, Figure 3; Figure 5 is a front view of another form of the tooth cleaner; Figure 6 is an axial section of the tooth cleaner on the line C—C, Figure 5; Figure 7 is a front view of the assembly of the same form of tooth cleaner as shown in Figures 5 and 6 and a latex rubber tissue skin; Figure 8 is an axial section of the tooth cleaner on the line D—D, Figure 7; Figure 9 is a sectional view on a vertical plane along the longitudinal center line of a tooth cleaner mounted detachably on a handle instead of an index finger tip cot; Figure 10 is a section of an assembly of the same tooth cleaner as shown in Figure 9 and a rubber latex tissue skin; and Figure 11 is a section of the handle of the tooth cleaner on the line E—E, Figure 9.

Figures 1 and 2 comprise a vesicle 4 suitably and fixedly mounted on an index finger tip cot 1 made of natural rubber latex tissue or other suitable material. The wall of vesicle 4 comprises a hemispherical portion 2 and a circular base formed from part of the finger tip cot 1. Vesicle 4 is completely filled with water W. The entire wall of vesicle 4 is impermeable to water and air.

The hemispherical wall portion 2 has a central, circular, comparatively small spot 3 which is extremely thin, bulgeable, stretchable, elastic and flexible and which is therefore made of extremely thin natural rubber latex tissue or other suitable material. The entire wall of vesicle 4 other than spot 3 should be preferably non-bulgeable or as nearly so as practicable and to this end is rendered non-stretchable or as nearly so as practicable by having taut non-stretchable fabrics 5 and 6 which themselves are imbedded in rubber, embedded in its internal surface or imbedded within it. The hemispherically formed fabric 5 and the flat, circular fabric 6 may be made of stretched taut fabrics of cotton filaments or other suitable material.

Suitable means other than fabric 5 and 6 may be employed to restrain the entire wall of vesicle 4 other than thin spot 3 from stretching.

The fluid contained in vesicle 4 should be preferably incompressible like water or other suitable liquid. Air being compressible would not be as satisfactory as water. The wall of vesicle 4 other than spot 3 may be made of other suitable material than rubber but to the extent that it stretches it should preferably be elastic enough to be restored to its original form and size. The entire wall of vesicle 4 should be flexible and non-irritating to the gums.

Figures 3 and 4 comprise the assembly of the same form of tooth cleaner as shown in Figures 1 and 2 and an extremely thin, bulgeable, stretchable, elastic, flexible detachable skin covering vesicle 4 and index finger tip cot 1 made of extremely thin, natural rubber latex tissue or other suitable material.

Figures 5 and 6 comprise a vesicle similar to those of Figures 1, 2, 3 and 4 except that the rigid, circular base 8 is substituted for the flexible, circular base of vesicle 4 shown in Figures 1, 2, 3 and 4. The rigid base 8 may be made of plastic, hard rubber or other suitable material. The vesicle is suitably fixedly mounted on an index finger tip cot.

Figures 7 and 8 comprise the assembly of the same form of tooth cleaner as shown in Figures 5 and 6 and an extremely thin, bulgeable, stretchable, elastic and flexible detachable skin 9 covering the vesicle only, made of extremely thin natural rubber latex tissue or other suitable material. The rigid circular base 8 is adapted to securely hold the skin 9. That portion of the skin 9 which covers the periphery of the circular, rigid base 8 may be thick.

Figure 9 comprises a vesicle similar to the vesicles shown in Figures 5, 6, 7 and 8 except that the rigid, circular base 8 has a frusto-conical increment 10 underneath it which fits snugly in, and slides into and out and is held securely by a dove-tail groove formed on the top surface of the handle 11.

Figure 10 comprises the assembly of the same form of tooth cleaner as shown in Figure 9 and a skin 9.

Other means of mounting a vesicle suitably and detachably on a proper handle similar to that of a tooth brush may be employed than the means shown.

When the vesicle of either form is pressed against and slid on the teeth and gums in normal operation, the comparatively small circular spot 3 bulges out against the teeth and gums and reaches between the teeth and into recesses and other concavities and automatically conforms to, and contacts the various contours of the teeth and gums and presses uniformly by hydraulic action substantially the entire exposed surfaces of the teeth and gums as firmly as the vesicle is pressed against the teeth and gums and furthermore thus reaches underneath the margins of the gums and cleans the necks of the teeth underneath those margins of the gums.

My tooth cleaner cleans teeth cleaner than a tooth brush does without irritating, bruising the gums.

The vesicle may have some other form than hemispherical. The bulgeable spot may be a narrow oval or an ellipse or other form instead of circular. The bulgeable spot may be flat or more convex than as shown or have other forms. Numerous other modifications may be readily conceivable.

The purpose of the detachable skins 7 and 9 is to take the wear unto themselves from the vesicles and thus prolong the durability of the vesicles which together with the index finger tip cot to which one form of the vesicle is fixedly attached or which without the finger tip cot in the form adapted for use with a handle, are more expensive than their respective skins 7 and 9.

I claim:

1. A tooth cleaner comprising a vesicle which is closed during normal operation and which is adapted to clean teeth, said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums.

2. A tooth cleaner comprising a vesicle which is closed during normal operation and which is adapted to clean teeth; said vesicle comprising a wall impermeable to a substantially imcompressible liquid; said imcompressible liquid enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums.

3. A tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being substantially non-bulgeable.

4. A tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; said vesicle being spherical so as to minimize the tendency of said remainder of said enclosing wall to bulge out.

5. A tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; said vesicle having a rigid non-bulgeable base.

6. A tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; the entire portion of the surface of said vesicle which contacts the teeth and gums being soft and flexible.

7. A tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; said tooth cleaner also comprising a finger cot; said vesicle being fixedly and suitably mounted on said finger cot.

8. A tooth cleaner comprising a completely and permanently closed vesicle adapted to clean teeth; said vesicle comprising a wall impermeable to a substantially imcompressible liquid, said imcompressible liquid completely enclosed by said wall and completely filling the space bounded by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums.

9. For use with a tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; said vesicle having a rigid non-bulgeable base; an extremely thin, flexible, stretchable and elastic skin which is conveniently attachable to, and detachable from, the edge of said rigid base and which skin is adapted to conform to, and to protect from wear during normal operation, the teeth cleaning surface of said vesicle.

10. For use with a tooth cleaner comprising a vesicle which is closed during normal operation and which is adapted to clean teeth; said vesicle comprising a wall impermeable to a flowable substance, a flowable substance enclosed by said wall; a portion of said enclosing wall being thin, flexible, stretchable, elastic and bulgeable, and the remainder of said enclosing wall being sufficiently non-bulgeable during normal operation to enable said bulgeable portion of said enclosing wall to bulge out, to conform automatically to, and to contact continuously, the variform exposed surfaces of the teeth and gums, to reach between the teeth and thus to clean substantially the entire exposed surfaces of the teeth and gums; said tooth cleaner also comprising a finger cot; said vesicle being fixedly and suitably mounted on said finger cot; an extremely thin, flexible, stretchable and elastic skin having an integral finger cot; said skin closely conforming to said vesicle during normal operation and being conveniently attachable to, and detachable from, said vesicle by means of said finger cot integral with said skin; said skin being adapted to conform to, and to protect from wear during normal operation, the teeth cleaning surface of said vesicle.

SAMUEL VICTOR.

REFERENCES CITED

The following references are of record in the file of this patent:

UNITED STATES PATENTS

| Number | Name | Date |
|---|---|---|
| 58,265 | Keiler | Sept. 25, 1866 |
| 877,585 | Nicolai | Jan. 28, 1908 |
| 1,913,928 | Kaufman | June 13, 1933 |
| 2,077,540 | Welker | Apr. 20, 1937 |
| 2,419,896 | Hobelmann | Apr. 29, 1947 |